United States Patent
Tanimoto (10) Patent No.: US 7,408,681 B2
(45) Date of Patent: Aug. 5, 2008

(54) FACSIMILE SERVER THAT DISTRIBUTES RECEIVED IMAGE DATA TO A SECONDARY DESTINATION

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 829 days.

(21) Appl. No.: 10/225,583

(22) Filed: Aug. 21, 2002

(65) Prior Publication Data

US 2003/0038980 A1    Feb. 27, 2003

(30) Foreign Application Priority Data

Aug. 22, 2001    (JP)    ............................... 2001-251744

(51) Int. Cl.
*H04N 1/00*    (2006.01)
(52) U.S. Cl. ...................... 358/400; 358/404; 358/407
(58) Field of Classification Search ............... 358/1.15, 358/426.05, 402, 403, 407, 408, 400, 401, 358/404, 444, 471, 494, 495, 474, 496; 709/203; 379/93.24, 100.08, 100.09
See application file for complete search history.

(56) References Cited

U.S. PATENT DOCUMENTS

| | | | | |
|---|---|---|---|---|
| 3,518,553 A | * | 6/1970 | Ho et al. | |
| 3,594,495 A | * | 7/1971 | Bond | .......................... 725/144 |
| 3,641,432 A | * | 2/1972 | Bond | .......................... 455/13.4 |
| 3,728,486 A | * | 4/1973 | Kraus | ........................... 379/69 |
| 3,760,171 A | * | 9/1973 | Wang et al. | |
| 3,913,721 A | * | 10/1975 | Koplow et al. | |
| 3,920,896 A | * | 11/1975 | Bishop et al. | ........... 379/100.13 |
| 3,993,862 A | * | 11/1976 | Karr | ....................... 358/426.01 |
| 3,995,106 A | * | 11/1976 | Wern et al. | ............. 379/102.02 |
| 4,058,672 A | * | 11/1977 | Crager et al. | ................ 370/394 |
| 4,058,838 A | * | 11/1977 | Crager et al. | ................ 358/425 |
| 4,091,424 A | * | 5/1978 | Widergren | .................. 358/3.29 |
| 4,106,060 A | * | 8/1978 | Chapman, Jr. | ............... 358/402 |
| 4,115,765 A | * | 9/1978 | Hartke | ......................... 345/553 |
| 4,137,491 A | * | 1/1979 | Bartley et al. | |
| 4,145,739 A | * | 3/1979 | Dunning et al. | |
| 4,198,677 A | * | 4/1980 | Brunner et al. | ............. 702/104 |
| 4,207,598 A | * | 6/1980 | Reich et al. | ............ 379/100.09 |
| 4,245,257 A | * | 1/1981 | Yamazaki et al. | ............ 382/244 |
| 4,249,216 A | * | 2/1981 | Kanda | .................... 379/100.14 |
| 4,255,619 A | * | 3/1981 | Saito | ........................ 379/93.17 |
| 4,326,098 A | * | 4/1982 | Bouricius et al. | ............ 713/155 |
| 4,327,251 A | * | 4/1982 | Fomenko et al. | ............. 704/270 |
| 4,340,783 A | * | 7/1982 | Sugiyama et al. | ....... 379/100.15 |
| 4,524,393 A | * | 6/1985 | Ohzeki | |

(Continued)

FOREIGN PATENT DOCUMENTS

JP    06-069954    3/1994

(Continued)

*Primary Examiner*—Jerome Grant, II
(74) *Attorney, Agent, or Firm*—Hogan & Hartson LLP (57) ABSTRACT

The present invention provides a facsimile server including a facsimile receiving unit for receiving image data and a distributing unit for distributing the image data that is received by the facsimile receiving unit to an original destination. The facsimile server also includes a storing unit for storing the image data when not distributed to the original destination. The distributing unit distributes the stored image data to a second destination that differs from the original destination.

20 Claims, 6 Drawing Sheets

U.S. PATENT DOCUMENTS

| | | | |
|---|---|---|---|
| 4,573,140 A * | 2/1986 | Szeto | |
| 4,582,957 A * | 4/1986 | Hayes et al. | |
| 4,586,086 A * | 4/1986 | Ohzeki | |
| 4,607,289 A * | 8/1986 | Kurokawa | |
| 4,630,196 A * | 12/1986 | Bednar et al. | |
| 4,638,118 A * | 1/1987 | Wang et al. | 178/18.01 |
| 4,716,544 A * | 12/1987 | Bartley | 345/564 |
| 4,763,191 A * | 8/1988 | Gordon et al. | |
| 4,785,473 A * | 11/1988 | Pfeiffer et al. | |
| 4,868,860 A * | 9/1989 | Andros et al. | |
| 4,970,603 A * | 11/1990 | Kanai | |
| 5,008,835 A * | 4/1991 | Jachmann et al. | |
| 5,062,076 A * | 10/1991 | Ho et al. | 710/21 |
| 5,115,326 A * | 5/1992 | Burgess et al. | |
| 5,200,993 A * | 4/1993 | Wheeler et al. | |
| 5,204,757 A * | 4/1993 | Agudelo et al. | 358/444 |
| 5,291,302 A * | 3/1994 | Gordon et al. | |
| 5,805,298 A * | 9/1998 | Ho et al. | 358/402 |
| 5,809,121 A * | 9/1998 | Elliott et al. | |
| 6,061,502 A * | 5/2000 | Ho et al. | 358/1.15 |
| 6,081,588 A * | 6/2000 | Ranalli et al. | 379/100.09 |
| 6,108,407 A * | 8/2000 | Meek et al. | 379/100.01 |
| 6,321,194 B1 * | 11/2001 | Berestesky | |
| 6,343,327 B2 * | 1/2002 | Daniels et al. | 709/239 |
| 6,463,145 B1 * | 10/2002 | O'Neal et al. | 379/211.02 |
| 6,493,022 B1 * | 12/2002 | Ho et al. | 348/154 |
| 6,643,034 B1 * | 11/2003 | Gordon et al. | |
| 6,782,415 B1 * | 8/2004 | Quine | 709/206 |
| 6,785,021 B1 * | 8/2004 | Gordon et al. | |
| 6,920,143 B1 * | 7/2005 | Ortiz et al. | |
| 7,202,978 B2 * | 4/2007 | Gordon et al. | |

FOREIGN PATENT DOCUMENTS

| | | |
|---|---|---|
| JP | 10-150465 | 6/1998 |
| JP | 11-065961 | 3/1999 |
| JP | 11-331452 | 11/1999 |
| JP | 11-338797 | 12/1999 |
| JP | 11-341213 | 12/1999 |
| JP | 2000-078306 | 3/2000 |
| JP | 2000-299757 | 10/2000 |
| JP | 2001-337905 | 12/2001 |
| JP | 2002-305551 | 10/2002 |

* cited by examiner

```
FOLLOWING IMAGE DATA IS ACCUMULATED WITHOUT BEING
DISTRIBUTED. PLEASE SELECT FILE TO CHANGE DESTINATION.

DESTINATION    FILE SIZE    RECEIVED
                            DATE AND TIME 1.            1.2MB        2001/08/01
  2.            600KB        2001/08/03

PLEASE SELECT NEW DESTINATION.

CLIENT B    CLIENT C    CLIENT D    PRINTER muratec@d.co.jp   075-111-XXXX
```

```
AFTER DISTRIBUTING SELECTED IMAGE DATA TO NEW
DESTINATION, DELETE?

PLEASE INPUT Y/N
  ☐
```

```
IMAGE DATA TO BE DISTRIBUTED IS NOT
ACCUMULATED.
```

← 22
↶ 10a

FACSIMILE SERVER THAT DISTRIBUTES RECEIVED IMAGE DATA TO A SECONDARY DESTINATION

FIELD OF THE INVENTION

The present invention relates to a facsimile server connected to a computer network, and more particularly, to a facsimile server provided with a function for distributing image data.

DESCRIPTION OF THE RELATED ART

A facsimile server has a function for distributing image data received by a G3 facsimile, Internet facsimile, or the like to a client terminal. The received image data is distributed to a client terminal designated by an inner mechanical setting, information attached to the received image data, or the like.

However, in the case the client terminal is not logged into the facsimile server, or in the case communication cannot be carried out reciprocally due to some communication problem even when the client terminal is logged in, image data is accumulated in a storing unit within the facsimile server, and until the client terminal logs in, or until the communication problem is solved, a part of the storing unit is occupied by the received image data. When this condition lasts for a long period of time, by a large volume of the image data being accumulated in the storing unit, the storing unit's free space decreases, and new image data cannot be received.

SUMMARY OF THE INVENTION

An advantage of the present invention is to provide a facsimile server for preventing the occurrence of problems such as a failure in the receiving of new image data due to the storage capacity of the storing unit being maximized by stored image data to be distributed when the client terminal does not login for a long period of time, or when the communication with the client terminal cannot be carried out.

The facsimile server of the present invention includes a function for distributing image data to a destination that differs from an original destination, when the image data that is accumulated in the storing unit to be distributed cannot be distributed even after an elapse of a prescribed period of time. Therefore, for example, the facsimile server of the present invention is capable of preventing the occurrence of the problems such as failure in the receiving of new image data due to the storing capacity of the storing unit being maximized by stored image data to be distributed when the client terminal does not login for a long period of time, or when the communication with the client terminal cannot be carried out.

In addition, the facsimile server of the present invention includes a function for distributing to a destination other than the original destination, the image data that is accumulated in the storing unit to be distributed, by external instructions. Therefore, according to the facsimile server of the present invention, other than the abovementioned effect, changes can be made at any time when an operator intends, to the destination of the image data that is accumulated without being distributed.

DETAILED DESCRIPTION OF THE PREFERRED EMBODIMENTS

Figure 1:
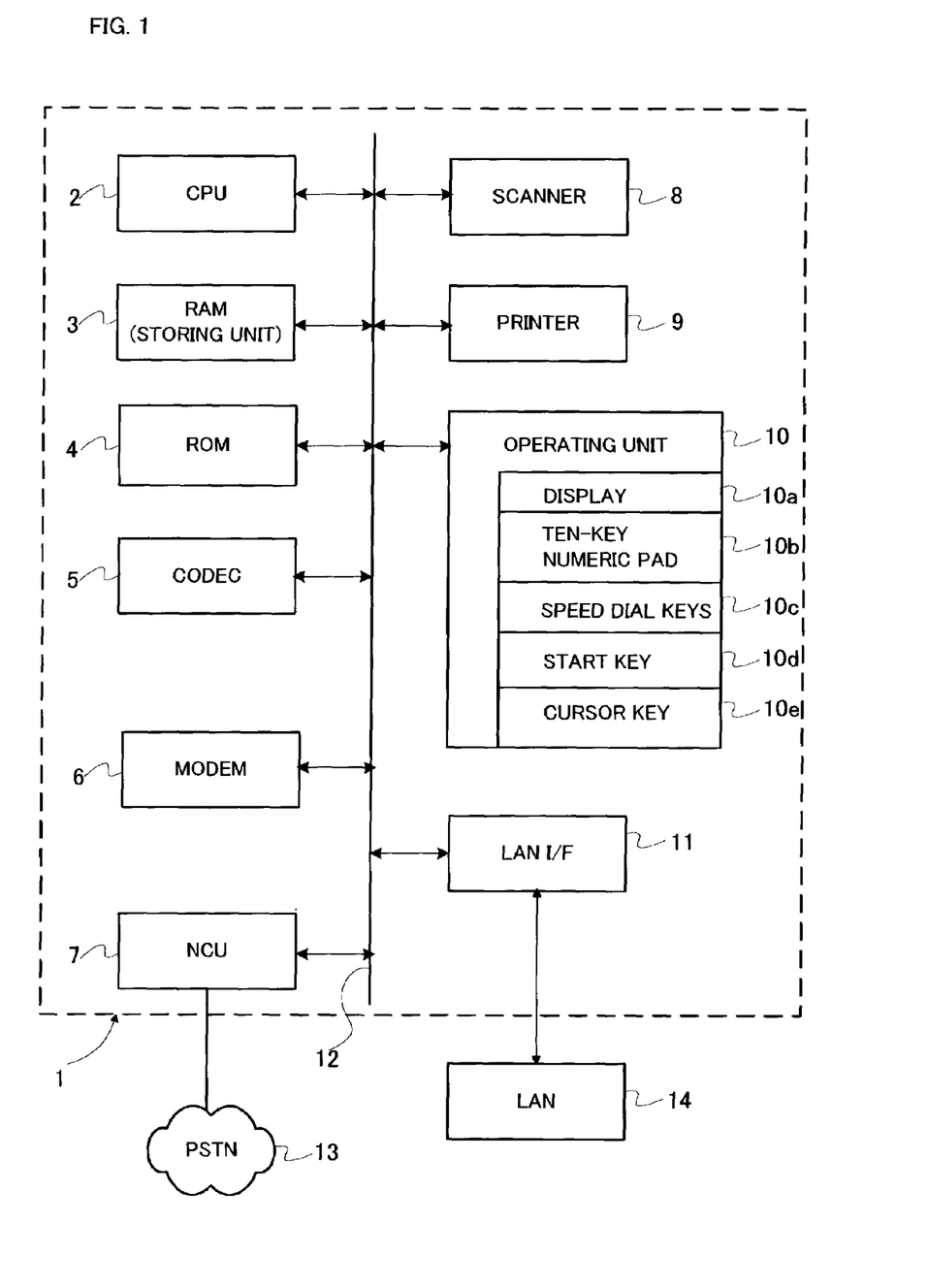
FIG. 1 is a block diagram showing an example of a hardware structure of the facsimile'server according to an embodiment of the present invention.

A facsimile server relating to an embodiment of the present invention will be described in accordance with the drawings. The specific configuration of the facsimile server is shown in FIG. 1. That is, the facsimile server 1 includes CPU (Central Processing Unit) 2, RAM (Random Access Memory) 3, ROM (Read Only Memory) 4, a codec 5, a modem 6, NCU (Network Control Unit) 7, a scanner 8, a printer 9, an operating unit 10, and LAN I/F (Local Area Network Interface) 11. Each of the units 2 through 11 is connected by a bus 12 so that the communication can be carried out.

The CPU 2 controls each unit composing the facsimile server 1 by following a predetermined program.

The RAM (storing unit) 3 functions as a storing unit for storing in advance FAX numbers, e-mail address, data tables to be mentioned later on, etc., or as a storing unit for various data or the like to be accumulated temporarily. Moreover, the image data to be distributed is accumulated within a prescribed storing area of the RAM 3.

The ROM 4 stores, for example, various programs for the operation of each of the units of the facsimile server 1 to be controlled by the CPU 2, and the program for converting the format of the image data.

The codec 5 encodes and decodes by adapting to a plurality of protocols. In other words, the codec 5 encodes the image data or the like scanned at the scanner 8 for transmission by MH (Modified Huffman), MR (Modified Read), MMR (Modified Modified Read) methods or the like, and decodes the received image data. Moreover, the codec 5 is also capable of encoding and decoding by adapting to TIFF (Tagged Image File Format), which is the image format generally used in computers. Further, the specification of the TIFF is publicized by the U.S. Adobe System.

The modem 6 carries out modulation and demodulation of the data to be transmitted and received in accordance with, for example, ITU-T (International Telecommunication Union-Telecommunications) Recommendation V. 34 standard, or others similar to this standard.

The NCU 7 is a network control device for making a telephone call, or disconnecting by controlling a telephone line, and is connected to PSTN (Public Switched Telephone Network) 13.

The scanner 8 scans the image data of an original, and outputs the image data converted into a binary of black and white.

The printer 9 includes of an electrophotographic method or the like, forms the received image data as an image onto a recording paper, and discharges the recording paper (prints out). For example, in accordance with the indication from the CPU 2, the printer 9 prints out the image data of the original scanned by the scanner 8, the image data received by a facsimile, the image data of an attached file or a text data of a main text that are received by the Internet facsimile.

The operating unit 10 includes, for example, a display 10*a* for displaying information concerning a condition of the facsimile server 1, various operation instruction screen, or the like, a ten-key numeric pad 10*b* for inputting the FAX numbers or the like, speed dial keys 10*c* for calling from speed dial numbers, a start key 10*d* for starting scanning operation of the original and so forth, and a cursor key 10*e* for transferring reversing display within the display 10*a*. Various operations are carried out from the operating unit 10.

The LAN I/F 11 includes an interface with LAN (Local Area Network) 14, and connects the LAN 14 and the facsimile server 1 so that the communication can be carried out.

The facsimile server 1 is provided with a function for transmitting and receiving by the facsimile, the image data of the original or the like by the G3 method or the like. In addition, the facsimile server 1 is provided with TCP/IP (Transmission Control Protocol/Internet Protocol), which is Internet standard protocol, and an Internet facsimile function for transmitting and receiving the image data of the original or the like by the electronic mail. For the image data to be transmitted and received by the electronic mail, the image data is formed in the TIFF format, made into a text in accordance with Base 64 or the like of MIME (Multipurpose Internet Mail Extensions), and is then attached to the electronic mail.

Figure 2A:
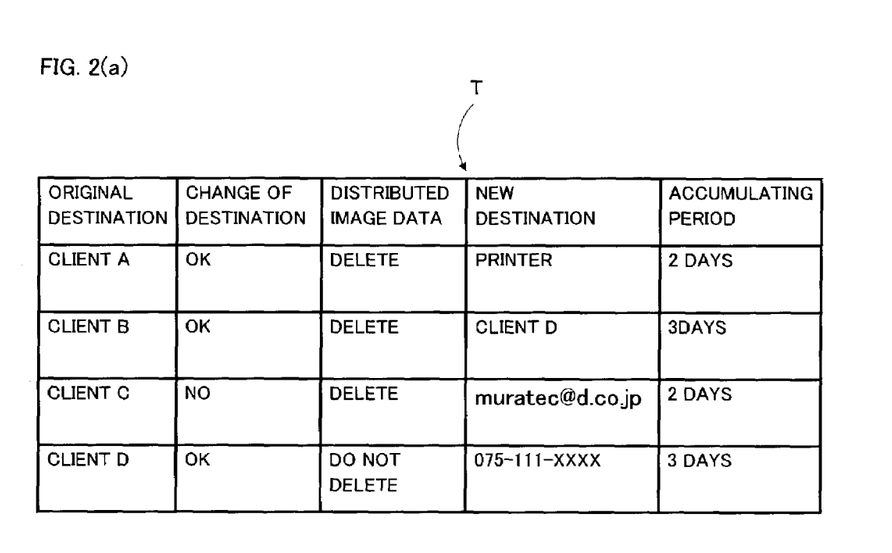
FIGS. 2(a) and 2(b) are views showing examples of the data table storing various conditions for when changing the destination per original destination information.

As shown in FIG. 2(*a*), the facsimile server 1 stores in the RAM 3, a data table T for storing per destination (hereinafter referred to as the "original destination") various conditions necessary for changing the destination of the received image data. The data table T includes "original destination" column for storing the information of the original destination, "change of destination" column for storing the information for designating whether or not the change can be made to the destination, "distributed image data" column for storing the information for designating whether or not to delete the received image data after distribution, "new destination" column for designating the information of the changed destination (hereinafter referred to as the "new destination"), and "accumulating period" column for storing the information for designating the period of time between changing the destination from the original destination to the new destination and then distributing the image data. For the information to be designated in the "new destination" column, for example, the printer 9 (can be an outside printer connected via a network, etc.) the ID of the client terminal, the mail address of the electronic mail receiving terminal, and the FAX numbers of other G3 facsimiles, are designated.

Figure 2B:
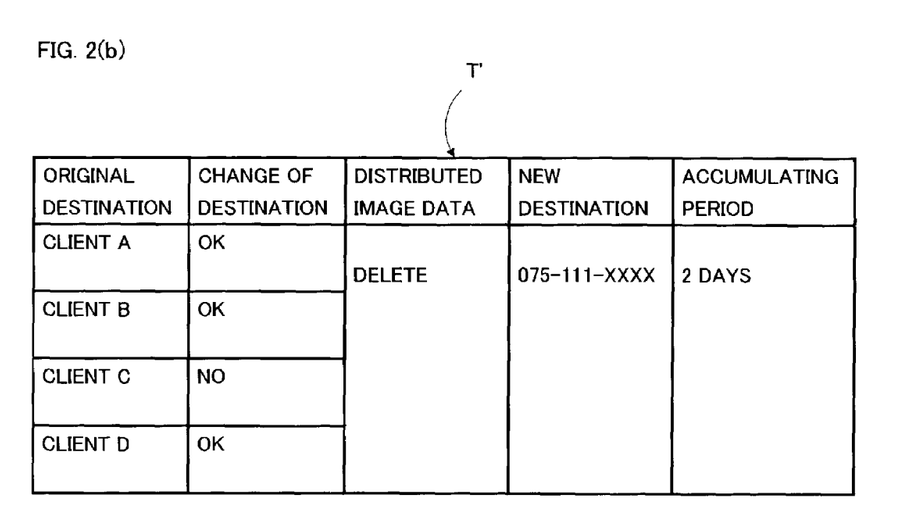

In the data table T, each condition can be set per original destination, however, to solve the problems when setting the condition per each original destination, as shown in the "distributed image data" column, the "new destination" column, and the "accumulating period" column in the data table T' shown in FIG. 2(*b*), the data table can be used that is in the format with same setting for all original destinations.

Figure 3:
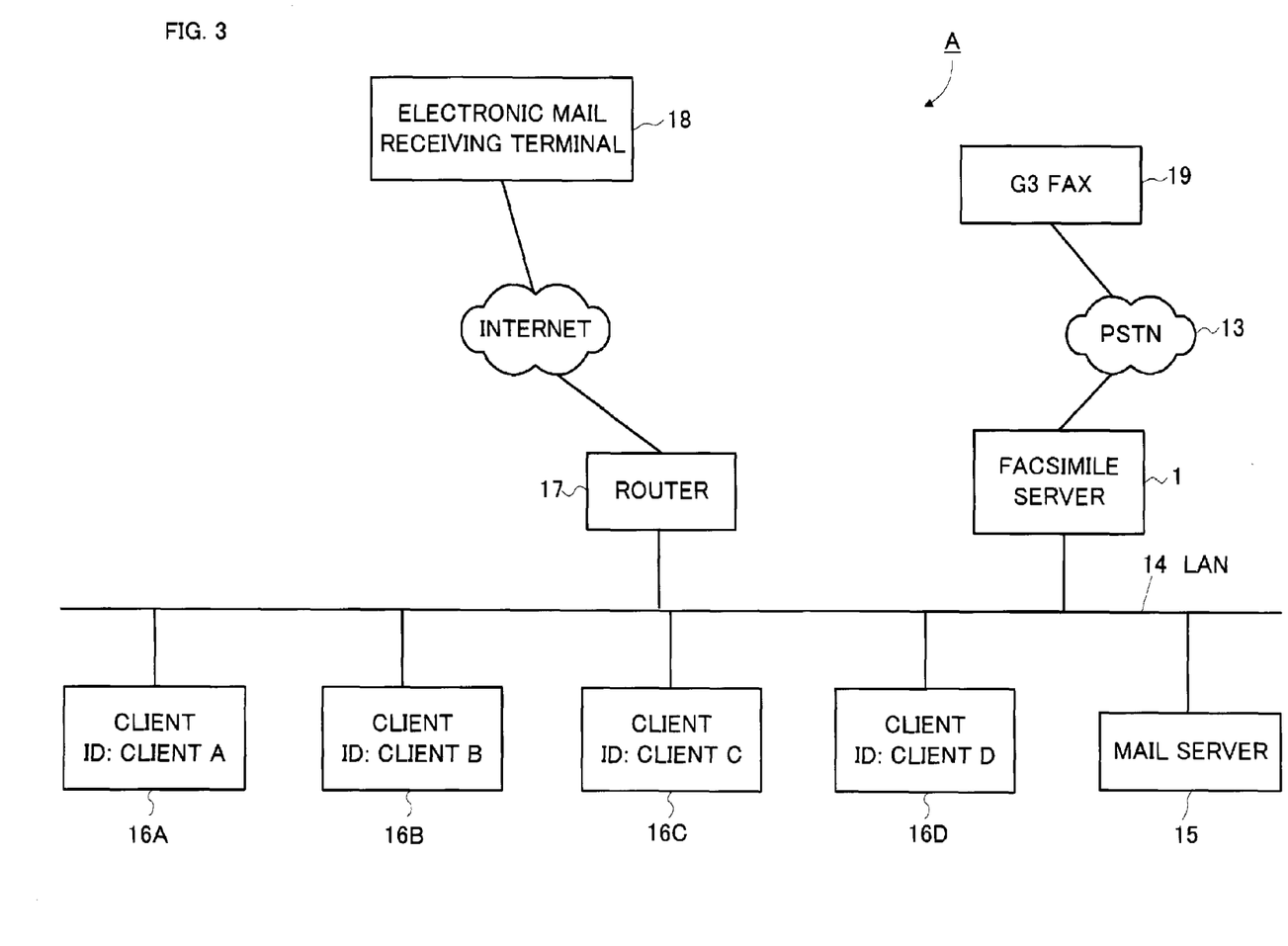
FIG. 3 is a view showing an example of the network environment where the facsimile server is provided.

The facsimile server 1 having the abovementioned structure and various function are used by being provided in, for example, a network environment (A) as shown in FIG. 3. In other words, the facsimile server 1 is connected reciprocally to a mail server 15, client terminals 16A through 16D, a router 17 or the like through the LAN 14 so that the communication can be carried out. Moreover, the facsimile server 1 is capable of carrying out the communication through the Internet with other electronic mail receiving terminal 18. In addition, the facsimile server 1 is also capable of transmitting and receiving the image data of G3 format with other G3 FAX terminal 19 through the PSTN 13.

Figure 4:
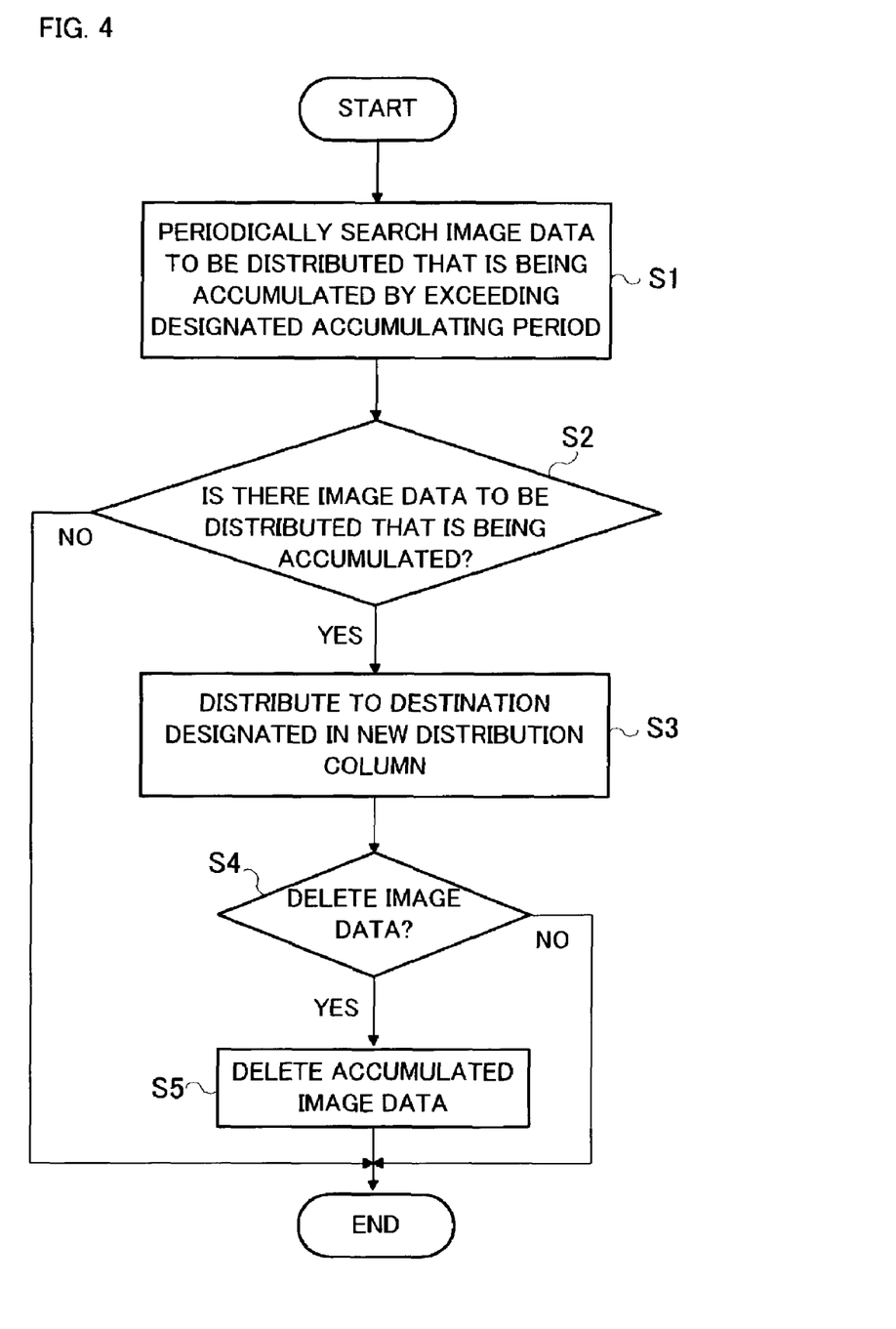
FIG. 4 is a flow chart showing an operation to be carried out in accordance with the information stored in the data table when the facsimile server receives the image data to be distributed.

Next, the operation to be carried out in accordance with the information that is stored in the data table T when the facsimile server 1 receives the image data through the Internet facsimile, G3 facsimile or the like which is to be distributed, will be described in accordance with the flow chart shown in FIG. 4. Further, the operation to be described in accordance with the flow chart is carried out by following the command generated by the CPU 2 in accordance with the control program or the like that is stored in the ROM 4 of the facsimile server 1.

The facsimile server 1 searches periodically whether or not the image data to be distributed to any one of the client terminals 16A through 16D is accumulated in the prescribed field within the RAM 3 from the time of receiving, exceeding the accumulating period (for example, two days) that is designated in the "accumulating period" column in the data table T (S1). In the case there is the image data being accumulated by exceeding the designated accumulating period (S2), the image data is distributed to the new destination that is designated in the "new destination" column of the data table T for the original destination of the image data (S3). In the case the "new destination" column is "printer", the accumulated image data is output to the printer 8 to be printed out. In the case the "new destination" column is "client ID", the accumulated image data is distributed to the client terminals 16A through 16D. In the case the electronic mail address is stored in the "new destination" column, the accumulated image data is transmitted to the electronic mail receiving terminal 18 having the electronic mail address stored in the "new destination" column. In the case the FAX number is stored in the "new destination" column, the accumulated image data is transmitted to the G3 facsimile 19 having the stored FAX number. Then, after distributing the image data to the new destination, it is determined whether or not to delete the image data in accordance with the information designated in the "distributed image data" column in the data table T (S4). In the case "delete" is stored in the column, the image data being accumulated by exceeding the accumulating period is deleted (S5). Meanwhile, in the case "not to delete" is stored in the column, the series of the operation is ended without deleting the image data.

Figure 5:
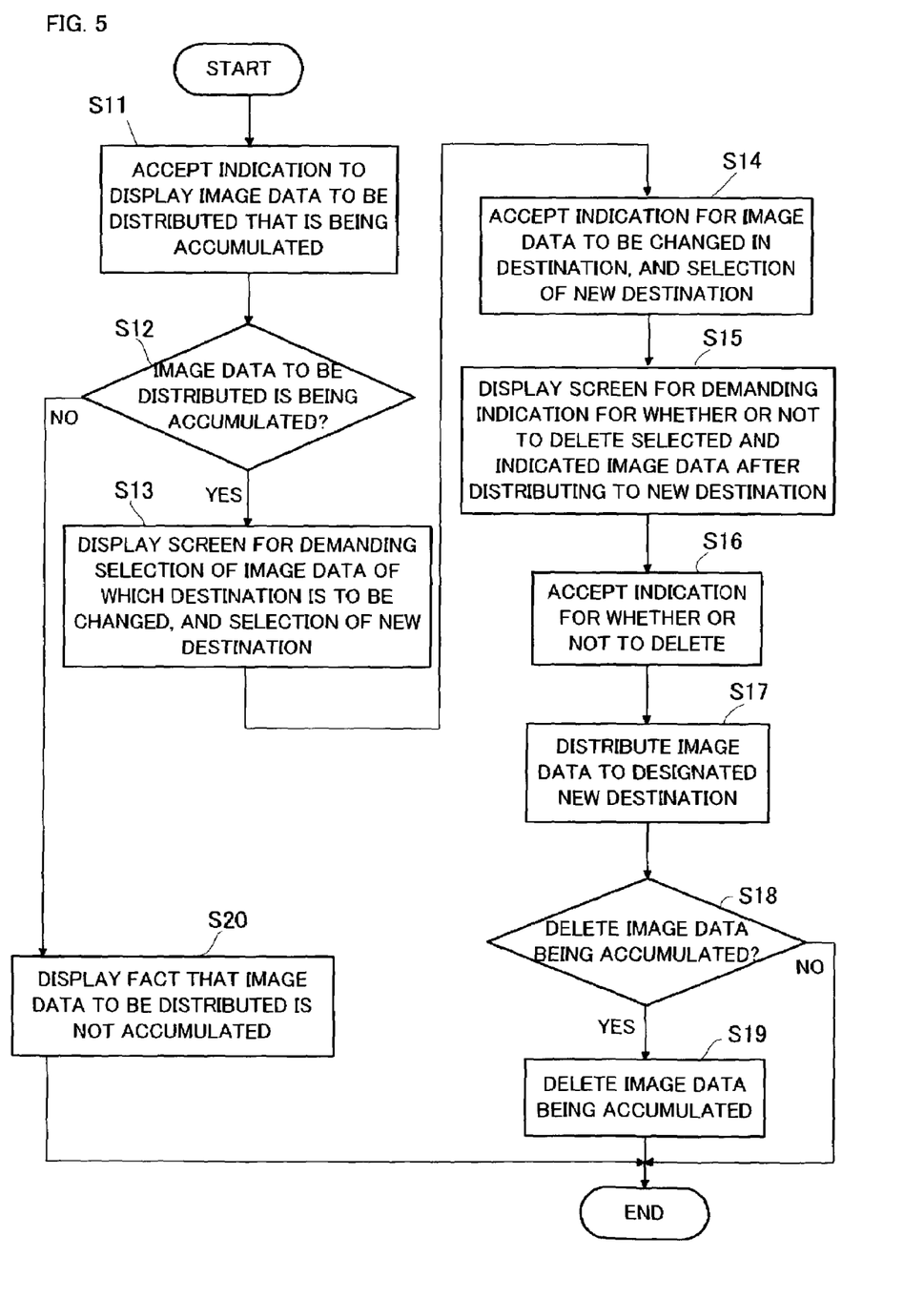
FIG. 5 is a flow chart showing an operation of the facsimile server of when distributing the image data that is accumulated without being distributed, to the destination other than the original destination by the operation of the operator.

As in the manner stated above, the facsimile server 1 carries out the distribution of the image data of the original that is accumulated in the RAM 3 for a prescribed period of time without being distributed, to the new destination that differs from the original destination, in accordance with the data table T. However, the facsimile server 1 is also capable of distributing the image data to the new destination that differs from the original destination, independently of the accumulating period designated in the data table T, by following the instruction from the outside, for example, the operator carrying out a predetermined operation from the operating unit 10, the client terminals 16A through 16D or the like. Next, the operation carried out by the facsimile server 1 for the time being will be described in accordance with the flow chart shown in FIG. 5. Further, the operation to be described in accordance with the flow chart is also carried out by following the command generated by the CPU 2 based on the control program or the like that is stored in the ROM 4 of the facsimile server 1.

Figure 6A:
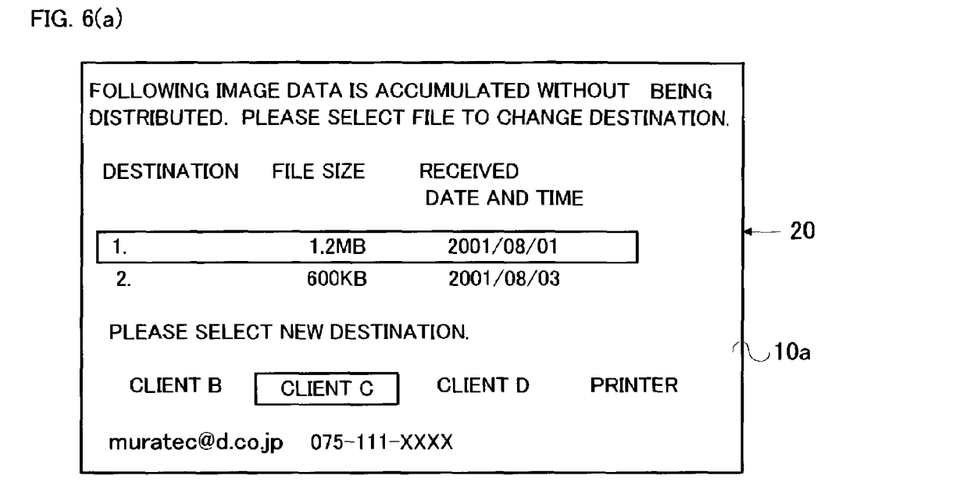
FIGS. 6(a), 6(b) and 6(c) are views showing an example of the screen or the like for demanding the indication for new destination and the indication for whether or not to delete the image data after distributing to new destination.
Figure 6B:
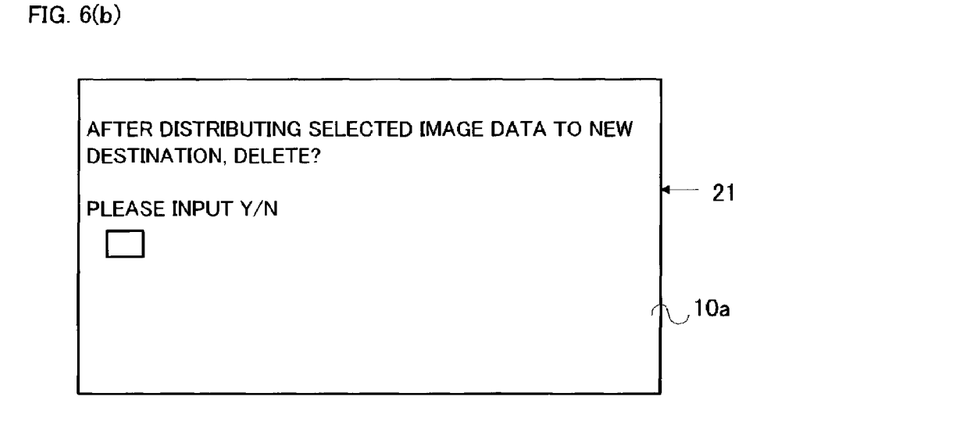
Figure 6C:
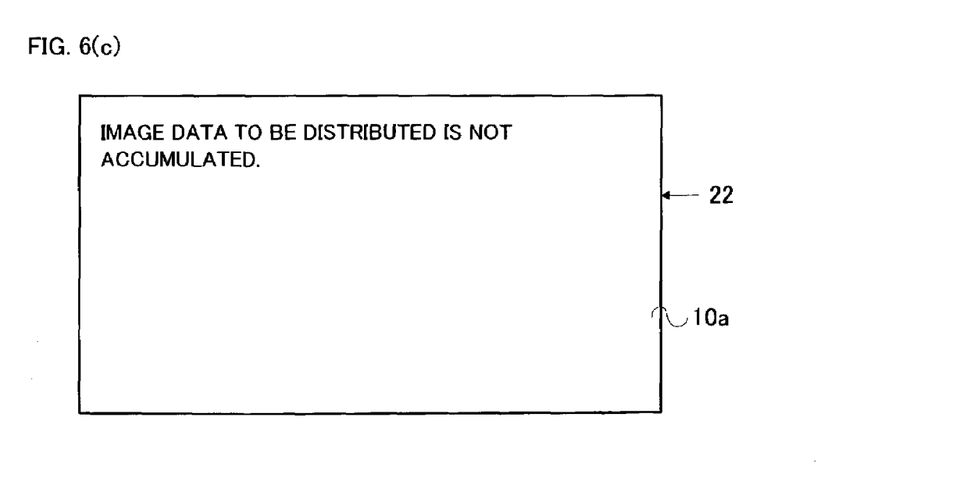

First, when a predetermined operation to display the image data that is accumulated in the RAM 3 without being distributed, is carried out by the operator or the like from the operating unit 10, the client terminals 16A through 16D or the like, the facsimile server 1 accepts the indication (S11). Then, it is determined whether or not the image data that is to be distributed is being accumulated in the RAM 3 without being distributed (S12). In the case the image data that is to be distributed is being accumulated, as shown in FIG. 6(a), the image data being accumulated is displayed, and a screen 20 is displayed for requesting to the operator to select the image data (file) to be changed in the destination and to select the new destination, or the screen information is transmitted to the client terminal (S13). For the displaying of the image data that is being accumulated, for example, the information concerning the image data, such as the original destination, the file size, and the received date and time, is displayed. When the indication is made by the operator from the screen 20 for the selection of the image data to be changed in the destination, or the selection of the new destination for the image data, the facsimile server 1 accepts the indication (S14). Then, as shown in FIG. 6(b), a screen 21 is displayed on the display 10a for demanding the operator to make indication for whether or not to delete the selected and indicated image data after distributing to the new destination, or the screen information is transmitted to the client terminal (S15). Consequently, when the indication is made by the operator from the screen 21 for whether or not to delete the image data that is being accumulated, the facsimile server 1 accepts the indication (S16), and the aforementioned image data that is being accumulated is distributed to the new destination that is indicated in S14 (S17). Then, it is determined whether or not to delete the image data that is being accumulated in accordance with the indication in S16 (S18). In the case the indication to delete the image data was accepted, the image data is deleted (S19). In the case the indication to not delete the image data was accepted, the series of the operation is ended without deleting the image data. Meanwhile, in the case it is determined in S12 that the image data to be distributed is not accumulated, as shown in FIG. 6(c), a screen 22 is displayed on the display 10a for showing the fact that the image data that is to be distributed is not accumulated, or the screen information is transmitted to the client terminal (S20), to notify the operator with the fact.

What is claimed is:

1. A facsimile server comprising:
    a facsimile receiving means for receiving image data from an original sender;
    a distributing means for distributing the image data that is received by the facsimile receiving means to an original destination;
    a storing means for storing the image data when not distributed to the original destination; and
    associating means for associating, independently of input from a recipient of the image data, independently of the received image data, independently of the location of the original destination, independently of the original sender, and independently of input from the original destination, the original destination with a second destination that differs from the original destination;
    wherein the distributing means distributes the stored image data to the second destination,
    wherein the means for associating comprises an accepting means for accepting indication of the second destination independently of the original sender, and wherein the distributing means determines the second destination in accordance with the indication that is accepted by the accepting means,
    wherein the means for associating comprises an accepting means for accepting an indication of whether to delete the stored image data after distribution by the distribution means independently of the original sender.

2. The facsimile server according to claim 1 wherein the associating means comprises a table that defines the second destination in association with each original destination, wherein the distributing means determines the second destination in accordance with the table, when the image data cannot be distributed to the original destination within a prescribed period of time.

3. The facsimile server according to claim 1, wherein the original destination or the second destination is a printer.

4. The facsimile server according to claim 1, wherein the original destination or the second destination is a client terminal.

5. The facsimile server according to claim 1, wherein the original destination or the second destination is an electronic mail receiving terminal.

6. The facsimile server according to claim 1, wherein the original destination or the second destination is another facsimile machine.

7. The facsimile server according to claim 1, wherein the accepting means for accepting indication of the second destination is an operating unit of the facsimile server.

8. A facsimile server comprising:
    a facsimile receiving unit for receiving image data from an original sender;
    a distributing unit for distributing the image data that is received by the facsimile receiving unit to an original destination;
    a storing unit for storing the image data when not distributed to the original destination; and
    an associating unit for associating, independently of input from a recipient of the image data, independently of the received image data, independently of the location of the original destination, independently of the original sender, and independently of input from the original destination, the original destination with a second destination that differs from the original destination;
    wherein the distributing unit distributes the stored image data to the second destination,
    wherein the associating unit comprises an accepting unit for accepting indication of the second destination independently of the original sender, and wherein the distributing unit determines the second destination in accordance with the indication that is accepted by the accepting unit,
    wherein the associating unit comprises an accepting unit for accepting an indication of whether to delete the stored image data after distribution by the distributing unit independently of the original sender.

9. The facsimile server according to claim 8 wherein the associating unit comprises a table that defines the second destination in association with each original destination, wherein the distributing unit determines the second destination in accordance with the table, when the image data cannot be distributed to the original destination within a prescribed period of time.

10. The facsimile server according to claim 8, wherein the original destination or the second destination is a printer.

11. The facsimile server according to claim 8, wherein the original destination or the second destination is a client terminal.

12. The facsimile server according to claim 8, wherein the original destination or the second destination is an electronic mail receiving terminal.

13. The facsimile server according to claim 8, wherein the original destination or the second destination is another facsimile machine.

14. The facsimile server according to claim 8, wherein the accepting unit for accepting indication of the second destination is an operating unit of the facsimile server.

15. A method for distributing image data that is received by a facsimile server, comprising:

receiving image data from an original sender;

associating, independently of input from a recipient of the image data, independently of the received image data, independently of a location of an original destination, independently of the original sender, and independently of input from the original destination, the original destination with a second destination that differs from the original destination; and distributing the received image data to the second destination, when the received image data cannot be distributed to the original destination, wherein the original destination is associated with the second destination by accepting the indication of the second destination independently of the original sender; and wherein the second destination is determined in accordance with the accepted indication, wherein the image data is deleted after distribution by accepting an indication of whether the image data is to be deleted after distribution independently of the original sender.

16. The method according to claim 15 wherein the original destination is associated with the second destination by a table stored in the facsimile server defining the second destination in association with original destination; and wherein the second destination is determined in accordance with the original destination, when the image data cannot be distributed to original destination within a prescribed period of time.

17. The method according to claim 15 further comprising providing the original destination or the second destination as a printer.

18. The method according to claim 15 further comprising providing the original destination or the second destination as a client terminal.

19. The method according to claim 15 further comprising providing the original destination or the second destination as an electronic mail receiving terminal.

20. The method according to claim 15, wherein the indication of the second destination is accepted by an operating unit of the facsimile server.

* * * * *